United States Patent [19]
Bell et al.

[11] Patent Number: 6,033,003
[45] Date of Patent: Mar. 7, 2000

[54] VEHICLE SPARE TIRE STORAGE SYSTEM

[75] Inventors: Larry W. Bell, Canton; Medard E. Kaluszka, Sterling Heights; Jeff D. Stevenson, Shelby Township; Peter J. Schwartz, Clinton Township, all of Mich.

[73] Assignee: DaimlerChrysler Corporation, Auburn Hills, Mich.

[21] Appl. No.: 09/201,971

[22] Filed: Dec. 1, 1998

Related U.S. Application Data

[63] Continuation-in-part of application No. 08/939,024, Sep. 26, 1997.

[51] Int. Cl.[7] .................................................. B62D 43/10
[52] U.S. Cl. ............................................................. 296/37.3
[58] Field of Search ............................................ 296/37.3

[56] References Cited

U.S. PATENT DOCUMENTS

| | | | |
|---|---|---|---|
| 4,991,898 | 2/1991 | Nomura | 296/37.3 |
| 5,050,926 | 9/1991 | Tanaka | 296/146 |
| 5,056,846 | 10/1991 | Tanaka | 296/37.1 |
| 5,056,858 | 10/1991 | Tanaka | 296/146 |
| 5,061,002 | 10/1991 | Saso | 296/37.3 |
| 5,080,417 | 1/1992 | Kanai | 296/37.3 |
| 5,257,846 | 11/1993 | Kanai | 296/37.14 |
| 5,669,534 | 9/1997 | Edgerley | 224/42.23 |
| 5,791,533 | 8/1998 | Neag . | |

FOREIGN PATENT DOCUMENTS

| | | | |
|---|---|---|---|
| 135347 | 7/1985 | Japan | 296/37.3 |
| 406247211 | 9/1994 | Japan | 296/37.3 |

*Primary Examiner*—Gary C. Hoge
*Attorney, Agent, or Firm*—Marc Lorelli

[57] ABSTRACT

A cover for a spare tire storage system including a tub located beneath a floor of a vehicle. The cover includes a pivoting element utilized to pivot the cover to gain access to the tub. The pivoting element is also capable of being removed so that the entire cover can be removed from the vehicle and used as a working mat.

12 Claims, 3 Drawing Sheets

VEHICLE SPARE TIRE STORAGE SYSTEM

This is a continuation-in-part of my prior application Ser. No. 08/939,024, filed Sep. 26, 1997.

BACKGROUND OF THE INVENTION

1. Technical Field

The present invention generally relates to a storage system for a vehicle spare tire. More particularly, the present invention relates to a storage system for a spare tire of a vehicle having a rearwardly located storage area, the storage system including a storage tub located below the floor of the vehicle and a reinforced cover therefore.

2. Discussion

Automotive vehicles, such as minivans, vans, station wagons, sport utilities and the like are often purchased for their carrying capacity. These types of vehicles typically include a rear storage area accessible via a lift gate or tailgate. Because such vehicles are not provided with a trunk, packaging issues frequently arise concerning storage of the spare tire. Frequently, the spare tire is mounted in an upright position within the rearward storage area and adjacent one of the vehicle side walls. However, this type of storage significantly impacts the carrying capacity of the vehicle and reduces visibility.

It is also known to mount the spare tire to the underside of the vehicle body. Access to the spare tire is difficult, and can be an extremely dirty endeavor to change a flat tire. In recent years there has been an industry wide push to supply functional vehicles, such as those mentioned above, with a higher level of luxury. An offshoot of the luxury concept would be to provide a clean and easy way to change a flat tire, and this underside mount of the spare tire would not suffice.

In other arrangements, the spare tire is mounted to the lift gate or on a swing gate positioned adjacent the lift gate. Such arrangements are disadvantageous in that additional weight is carried by the lift gate or the swing gate must be moved out of the way before access to the lift gate may be obtained.

It is also known to store the spare tire within a storage compartment or tub provided below the vehicle's floor. Some type of cover is typically provided for concealing the tub. While the tub does not impede upon the carrying capacity of the rearward storage area and access to the spare tire is relatively easy, the amount of weight which may be positioned directly above the tub is limited due to the load carrying capacity of conventional covers. As a result, larger adults and cargo of significant weight cannot be placed above the tub.

SUMMARY OF THE INVENTION

Accordingly, it is a principal objective of the present invention to provide a storage system for a vehicle spare tire storage system that facilitates a clean and easy method for changing a flat tire. It is another objective to provide a storage system for a vehicle spare tire that does not limit the weight or size of the cargo carried within a rear storage area of a mini-van, van, sport utility vehicle, station wagon, or the like. It is yet another objective of the present invention to provide a storage system for a vehicle spare tire that does not impede access to a rear storage area of the vehicle through a liftgate.

In one form, the present invention provides a cover for a spare tire storage system including a tub located beneath a floor of a vehicle. The cover includes a pivoting element utilized to pivot the cover to gain access to the tub. The pivoting element is also capable of being removed so that the entire cover can be removed from the vehicle and used as a working mat to keep the operator's clothes clean while changing a tire.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
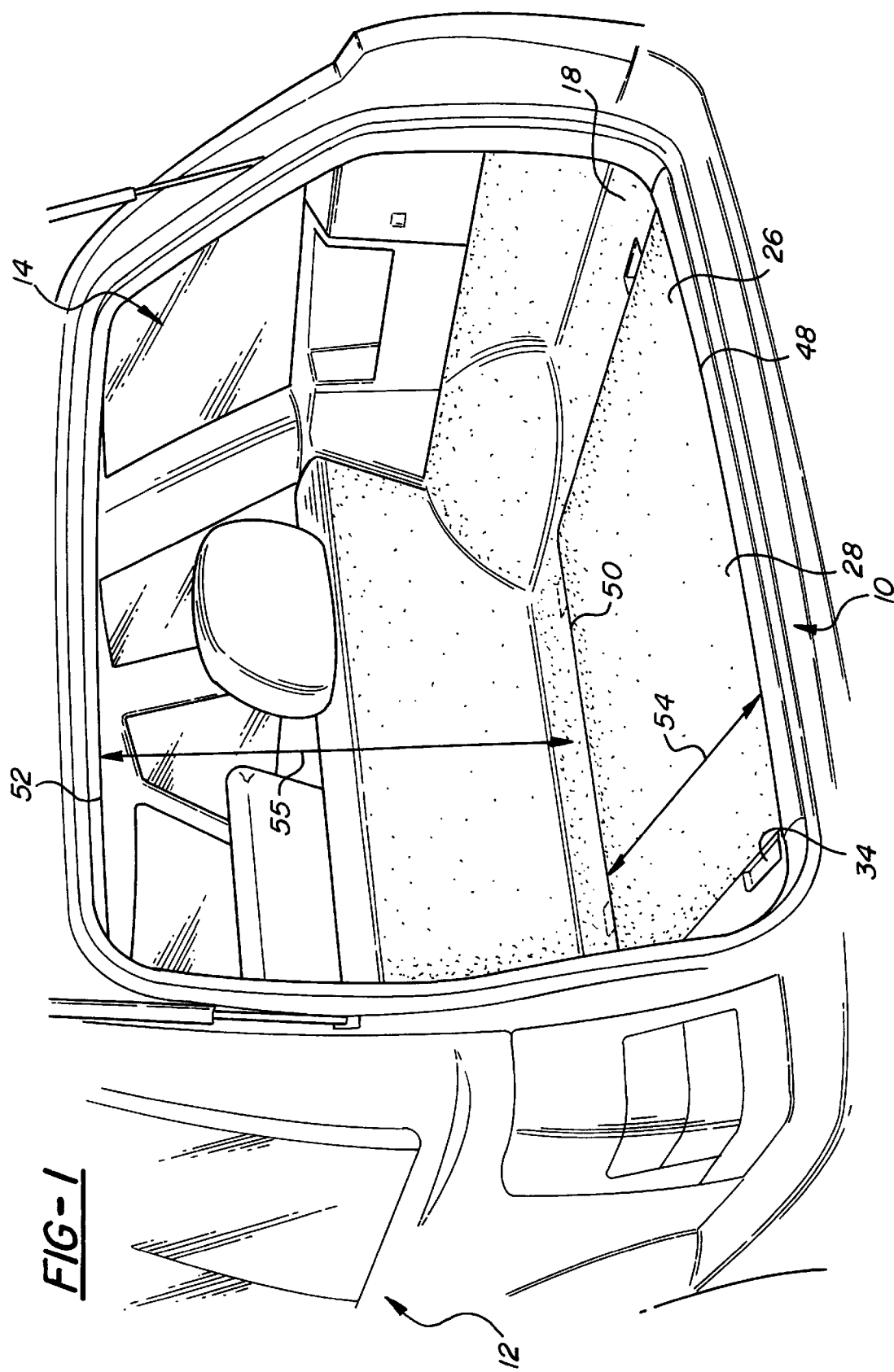
FIG. 1 is a perspective view illustrating a rear portion of a motor vehicle incorporating the storage system for a spare tire constructed in accordance with the teachings of a preferred embodiment of the present invention.

Turning first to the perspective view of FIG. 1, a spare tire storage system 10 for a motor vehicle 12 is illustrated. Spare tire storage system 10 is shown operatively installed within a rear storage area 14 of the vehicle 12. The exemplary vehicle partially shown in FIG. 1 is a minivan, sport utility vehicle, or the like. However, it will be understood that the teachings of the present invention are more widely applicable to various other vehicles.

Figure 2:
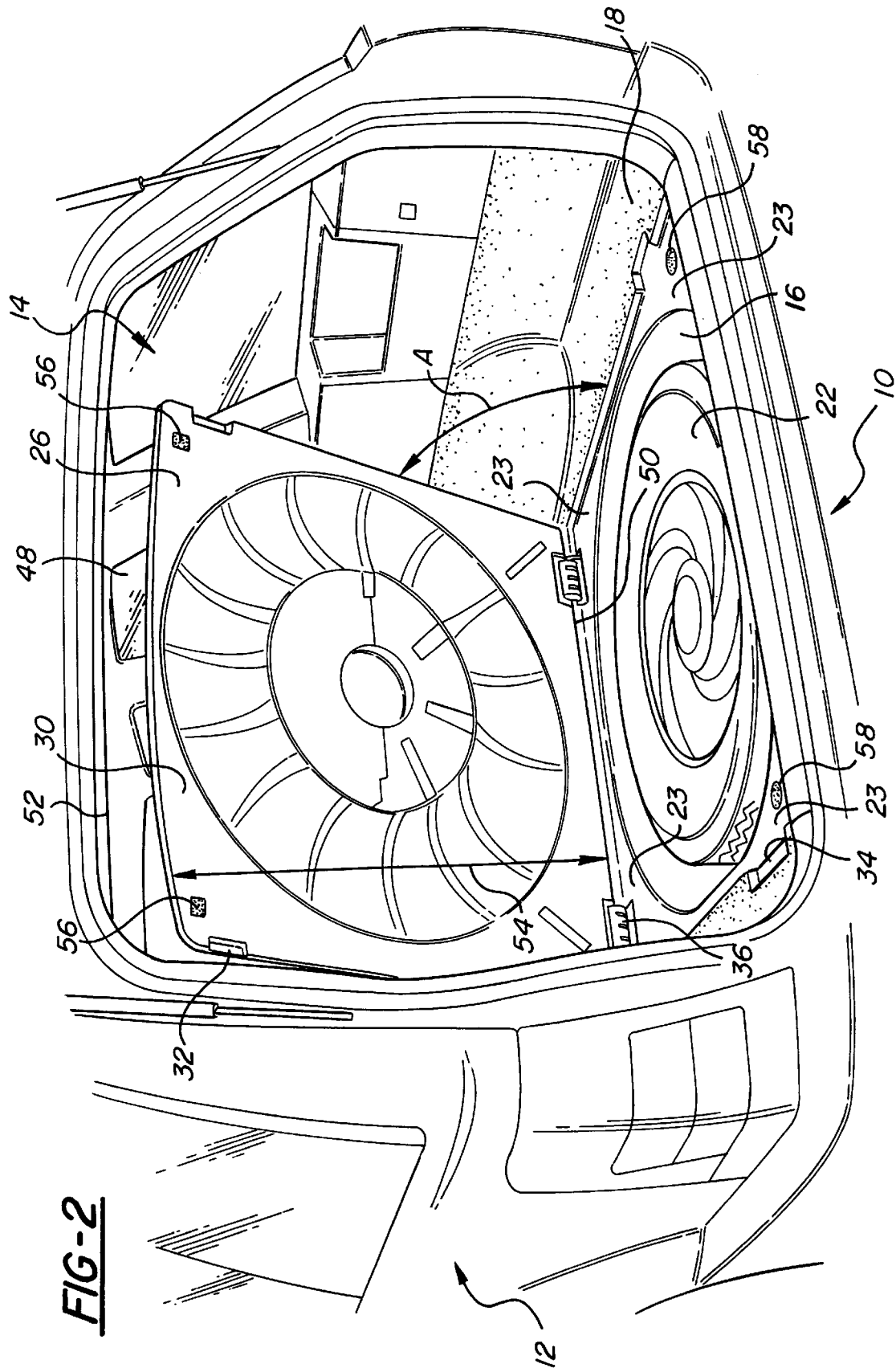
FIG. 2 is a perspective view illustrating a rear portion of a motor vehicle incorporating the storage system with the cover pivoted to allow access to the spare tire compartment.

Spare tire storage system 10 of the present invention is shown (FIG. 2) in a position to allow access to a tub 16 located below the floor 18 of vehicle 12. Tub 16 defines a storage area for storing a spare tire 22 and is circumscribes by an upper periphery surface 23. Spare tire 22 illustrated is a full-size spare, but alternatively a reduced-size spare may be stored. Spare tire 22 is secured within tub 16 by a conventional clamping mechanism. Spare tire storage system 10 is further shown to include a cover 26 for selectively providing access to tub 16 and upper periphery surface 23.

Figure 3:
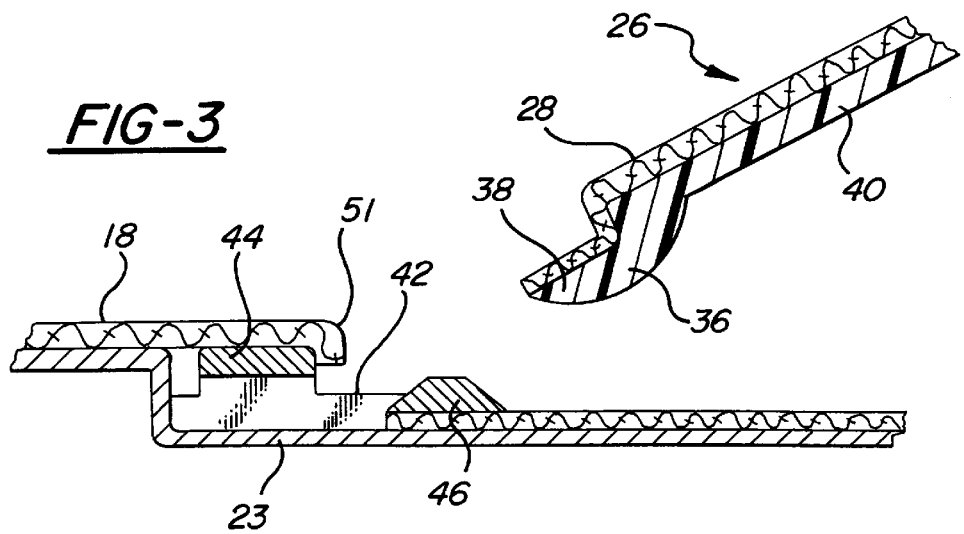
FIG. 3 is a cross sectional view of the pivoting element of the cover removed from the vehicle.
Figure 4:
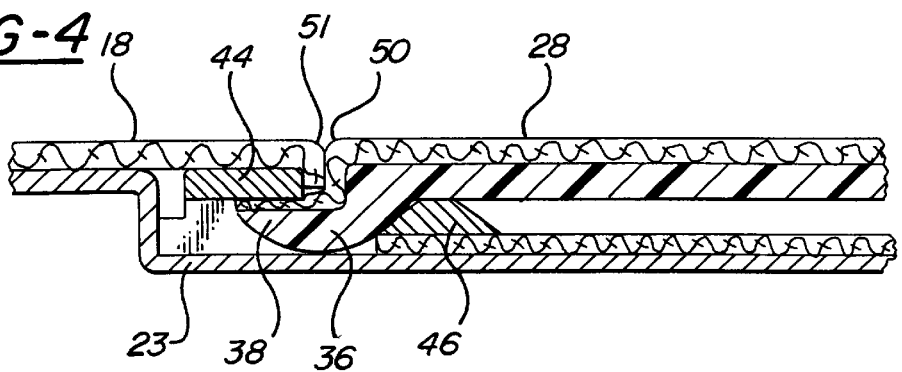
FIG. 4 is a cross sectional view of the pivoting element of the cover in the closed position, in which the top surface of the cover is substantially co-planar with the floor of the vehicle.

In general, the cover 26 includes a top surface 28, which may be carpeted, and a bottom surface 30 made plastic, a material that is easily cleanable. The cover 26 is also shown to generally include a pair of hidden handles 32 and a pair of depressions 34 in the floor to allow for ease of use of cover 26. Integral with the cover 26 is a pair of pivoting elements 36. Pivot tabs 36, as best seen in FIGS. 3 and 4, comprises an insertion lever 38 having a curved bottom that is disposed substantially below the body portion 40 of cover 26. Pivot tabs 36 are adapted to engage into recesses 42 carried by the vehicle to facilitate pivotal movement of cover 26 from a closed position (as shown in FIG. 1) and open position (shown in FIG. 2). The open position allows for access to tub 16 and to spare tire 22. The direction of movement is indicated by arrow A. Pivot tabs 36 also permit quick and easy withdrawal of cover 26 from vehicle 12.

Figure 5:
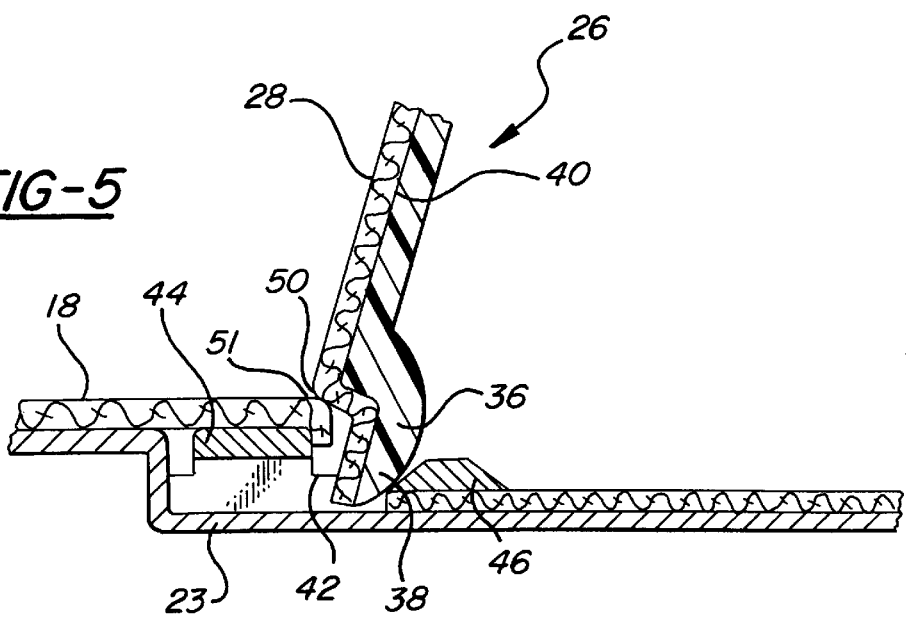
FIG. 5 is a cross sectional view of the pivoting element of the cover in the substantially vertical position, in which the top surface of the cover is at substantially a 90° angle with the floor of the vehicle.

FIG. 4 illustrates the cover in the closed position. In this position, top surface 28 of cover 26 is co-planar with floor 18 of vehicle 12. Attached to vehicle 12 are a top support 44 and a bottom support 46. contact between top support 44 and cover 26 prevents both substantial vertical movement of cover 26 and cooperates with insertion lever 38 to ensure the coplanar relationship between cover 26 and floor 18. Contact between bottom support 46 that protrudes above periphery surface 23 and cover 26 prevents horizontal movement of cover 26 in the closed position and is disposed rearward from top support as shown in FIGS. 3–5. As cover 26 is raised from the rear edge 48 cover 26 begins to pivot about the front edge 50 of cover 26 Front edge 50 of cover is adjacent to the corner edge 51 of recess 42. As cover 26 pivots to a certain position, cover 26 is capable of being removed from vehicle 12. Pivot tabs 36 can be completely removed from recess 42 as shown in FIG. 3. It should be appreciated that recess 52 is bounded by top support 44, bottom support 46, and periphery surface 23. This allows cover 26 to be used as a mat by the operator of the vehicle while changing a flat tire or while performing any other activity that might requires a mat. The bottom surface 30 may become dirty during such an endeavor, but when cover 26 is placed back into vehicle 12, the dirt on bottom surface 30 will not be seen by the vehicle operator while cover 26 is in the closed position.

FIG. 5 illustrates cover 26 in a substantially vertical position. This position allows for unencumbered usage of all of the contents of tub 16. Pivot tab 36 contacts bottom support 46 and the surface 23 in this position, which establishes cover 26 at a substantial vertical position. Such a substantial vertical position forming essentially a 90° angle between cover 26 and floor 18. It can also be appreciated that the angle between cover 26 and floor 18 is not limited at 90°. In order to facilitate this position, the distance 55 between floor 18 and the headliner 52 of vehicle 12 is equal to or greater than the length 54 of cover 26 in at least one specific area. One of ordinary skill in the art that will appreciate that the headliner 52 may be any type of formation that limits the rear storage area 14 of vehicle 12.

The cover 26 preferably is a dual layer blow molded member, manufactured preferably from a blow-moldable material, and more preferably from 30% glass-filled polypropylene, and covered by carpet layer. Any suitable material may be used to construct the dual layer cover, for example, two stampings of steel may be joined at their edges.

Near rear edge 48 of cover 26 are a pair of locking mechanisms 56, which act to secure cover 26 in the closed position when desired. Locking mechanisms 56 cooperate with mating portions 58 on vehicle 12 to provide a coupling of cover 26 to vehicle 12. In the preferred embodiment locking mechanisms 56 and mating portions 58 are a type of Velcro fastening system. One of ordinary skill in the art can appreciate that a number of alternative locking mechanisms may be used for this particular application.

While the above description constitutes the preferred embodiment of the invention, it will be appreciated that the invention is susceptible to modification, variation, and change without departing from the proper scope or fair meaning of the accompanying claims.

What is claimed is:

1. A spare tire storage system for a vehicle having a floor with a recess formed therein and a headliner, the spare tire storage system comprising:

a compartment located below the floor of the vehicle, said compartment including a storage area and an opening thereto;

a cover having a front edge and a rear edge, said cover adapted for selectively concealing said opening; and a pivoting element disposed at said front edge of said cover; said pivoting element cooperative with said recess and capable of pivoting said cover about said front edge and capable of disengagement such that said cover may be removed from said vehicle, said recess being bound by a top support and a bottom support, said cover being selectively moveable to a substantially vertical position while said pivoting element is in substantial contact with said top support and said bottom support.

2. The invention as set forth in claim 1, wherein said pivoting element comprises a pivot tab adapted to contact the vehicle, while said cover selectively conceals said opening contact between said pivot tab and said top support restricts vertical movement of said cover and contact between said pivot tab and said bottom support restricts horizontal movement of said cover.

3. The invention as set forth in claim 1, wherein said cover includes a top surface and a bottom surface, said bottom surface comprised of an easily cleanable material.

4. The invention as set forth in claim 3, further comprising a locking mechanism disposed near said rear edge capable of coupling said cover to the vehicle, said locking mechanism disposed on said bottom surface of said cover such that said locking mechanism is concealed during said selective closing of said cover, and wherein said locking mechanism is comprised of mating velcro fasteners, one of said mating velcro fasteners being disposed on said bottom surface of said cover.

5. The invention as set forth in claim 4, wherein said top surface of said cover and the floor of the vehicle are co-planar when said cover is coupled to the vehicle.

6. The invention as set forth in claim 5, wherein said top surface of said cover is comprised of carpet.

7. A spare tire storage system comprising:

a vehicle including a headliner and a floor, said floor having a recess formed therein;

a tub located below the floor of said vehicle, said tub including a storage area and an opening thereto, said tub also includes a raised upper surface;

a cover for selectively closing said opening to said storage area; said cover having a front edge, a rear edge, and a planar top surface; and a pivot tab integral with said cover and disposed at said front edge, said pivot tab cooperative with said recess wherein said recess is bounded by a top support and a bottom support, said bottom support projects upwardly from said upper surface of said tub.

8. The invention as set forth in claim 7, wherein said cover is selectively moveable to a substantially vertical position, and wherein said floor of said vehicle and said headliner of said vehicle and are separated by a distance, said distance equal to or greater than the length of said cover.

9. The invention as set forth in claim 7, further comprising a locking mechanism disposed near said rear edge on said bottom surface of said cover such that said locking mechanism is concealed during selective closing of said cover, said locking mechanism capable of coupling said cover with said vehicle; when said cover is coupled to said vehicle, said top surface of said cover and said floor of said vehicle are co-planar.

10. A spare tire storage system for a vehicle including a rearward storage area, a floor having a recess formed therein, the spare tire storage system comprising:
- a tub located below the floor of the vehicle, said tub including a storage area and an opening thereto;
- a cover free from holes for selectively closing said opening to said storage area; said cover having a front edge, a rear edge, and a planar top surface;
- a pivot tab integral with said cover and disposed at said front edge; said pivot tab comprises an insertion lever cooperative with the recess of the vehicle to pivot said cover about said front edge and to disengage said cover from the vehicle such that said cover can be removed from the vehicle, pivoting of said cover allows for access to said opening of said tub;
- a locking mechanism disposed near said rear edge of said cover capable of coupling said cover with the vehicle; when said cover is coupled to the vehicle said top surface of said cover and the floor of the vehicle are co-planar; and
- a handle integral with said cover and disposed near said rear edge of said cover and adjacent to a depression in the floor, said handle adapted for ease of closing and pivoting said cover.

11. The invention as set forth in claim 1, wherein said floor of said vehicle and said headliner of said vehicle and are separated by a distance, said distance equal to or greater than the length of said cover.

12. A spare tire storage system for a vehicle having a floor with a recess formed therein and a headliner, the spare tire storage system comprising:
- a compartment located below the floor of the vehicle, said compartment including a storage area and an opening thereto;
- a cover having a front edge and a rear edge, said cover adapted for selectively concealing said opening; and
- a pivoting element disposed at said front edge of said cover; said pivoting element cooperative with said recess and capable of pivoting said cover about said front edge and capable of disengagement such that said cover may be removed from said vehicle, said recess being bound by a top support and a bottom support, said bottom support being disposed rearward of said top support.

* * * * *